United States Patent
Frittoli et al.

(10) Patent No.: US 12,544,762 B2
(45) Date of Patent: Feb. 10, 2026

(54) LOADING MACHINE FOR SLIDES PROVIDED WITH BIOLOGICAL SAMPLES

(71) Applicant: ELLECI TECH SRL, Cappella Cantone (IT)

(72) Inventors: Chiara Frittoli, Cappella Cantone (IT); Lisa Frittoli, Cappella Cantone (IT)

(73) Assignee: ELLECI TECH SRL, Cappella Cantone (IT)

( * ) Notice: Subject to any disclaimer, the term of this patent is extended or adjusted under 35 U.S.C. 154(b) by 756 days.

(21) Appl. No.: 17/910,518

(22) PCT Filed: Mar. 2, 2021

(86) PCT No.: PCT/IT2021/050047
§ 371 (c)(1),
(2) Date: Sep. 9, 2022

(87) PCT Pub. No.: WO2021/181434
PCT Pub. Date: Sep. 16, 2021

(65) Prior Publication Data
US 2023/0023675 A1    Jan. 26, 2023

(30) Foreign Application Priority Data

Mar. 10, 2020  (IT) .................. 102020000005050

(51) Int. Cl.
*B01L 9/00*     (2006.01)
*B01L 99/00*    (2010.01)

(52) U.S. Cl.
CPC ........... *B01L 9/52* (2013.01); *B01L 2300/021* (2013.01); *B01L 2300/0822* (2013.01)

(58) Field of Classification Search
None
See application file for complete search history.

(56) References Cited

U.S. PATENT DOCUMENTS

| | | | |
|---|---|---|---|
| 4,766,714 A | 8/1988 | Sugaya | |
| 6,847,481 B1* | 1/2005 | Ludl | G01N 35/04 359/368 |
| 2014/0362436 A1* | 12/2014 | Forget | G02B 21/26 359/391 |

FOREIGN PATENT DOCUMENTS

| | | | | |
|---|---|---|---|---|
| AU | 2007219377 B2 * | 11/2010 | | G02B 21/244 |
| WO | 2016/016814 | 2/2016 | | |

OTHER PUBLICATIONS

International Search Report and Written Opinion of the ISA for PCT/IT2021/050047, mailed Apr. 9, 2021, 12 pages.

\* cited by examiner

*Primary Examiner* — Paul S Hyun
(74) *Attorney, Agent, or Firm* — NIXON & VANDERHYE

(57) ABSTRACT

Disclosed is a loading machine for slides, provided with biological samples and with an electronically readable identification code, inside a tray divided, by means of separation structures, into multiple compartments, each compartment being adapted to contain one of the slides in an orderly manner. The loading machine includes: a supporting frame structure for resting on a work surface; a linear feeder of the tray with respect to the frame structure; an inserter of the slides into the tray in an orderly and sequential manner; a reader of the identification code provided on each of the slides; and a control unit. The inserter of the slides into the tray includes a unit to temporarily retain each slide and to release it, in coordination with the reader and linear feeder of the tray, into one of the compartments making use of gravity.

8 Claims, 3 Drawing Sheets

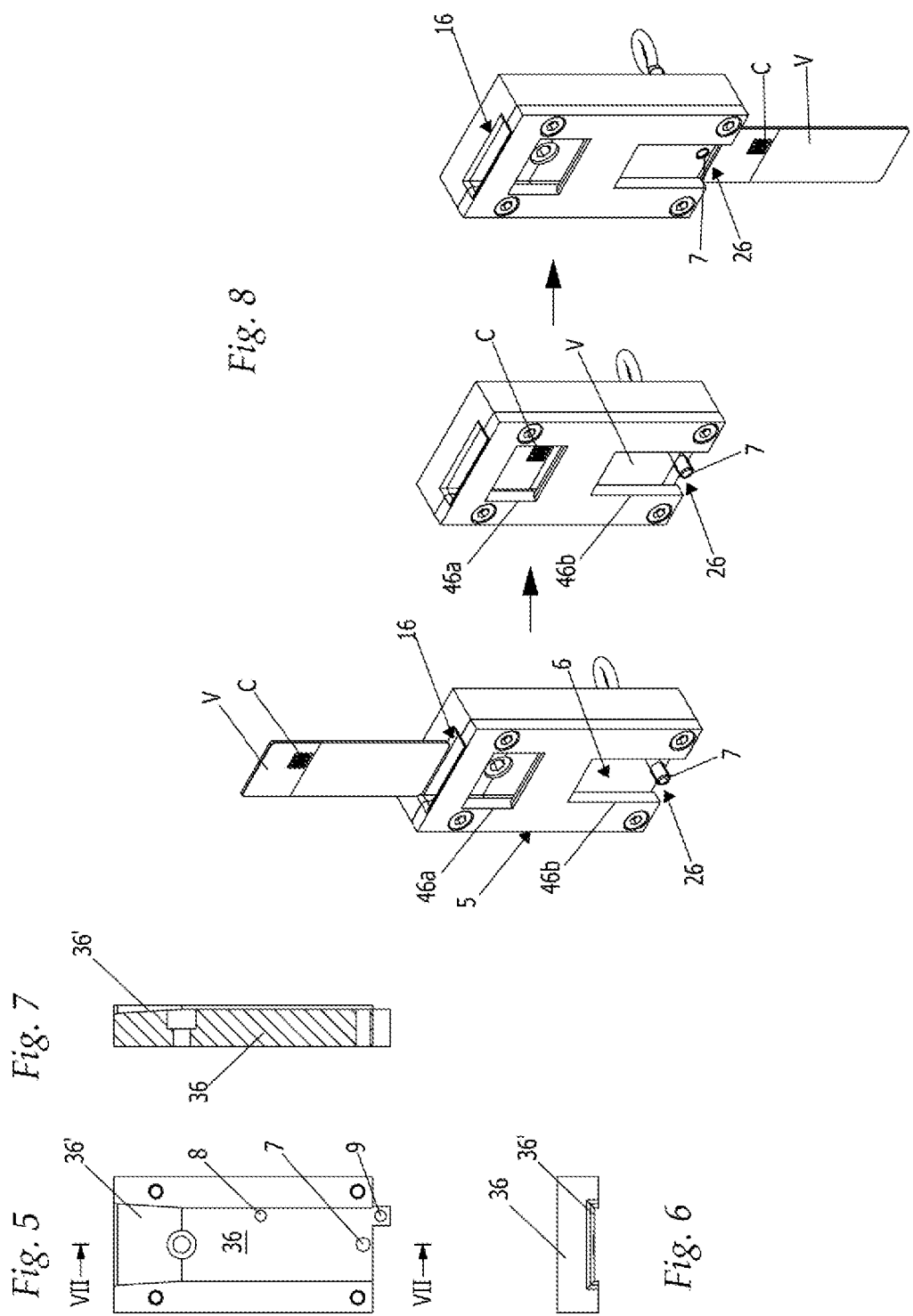

LOADING MACHINE FOR SLIDES PROVIDED WITH BIOLOGICAL SAMPLES

CROSS-REFERENCE TO RELATED APPLICATIONS

This application is the U.S. national phase of International Application No. PCT/IT2021/050047 filed Mar. 2, 2021, which designated the U.S. and claims priority to IT Patent Application No. 102020000005050 filed Mar. 10, 2020, the entire contents of each of which are hereby incorporated by reference.

BACKGROUND OF THE INVENTION

Field of the Invention

The invention relates to the field of apparatus and equipment for clinical diagnostics.

More in detail, the invention concerns a loading machine for slides provided with biological samples inside a tray divided, by means of separation structures, into a plurality of compartments, each compartment being adapted to contain one of said slides in an orderly manner.

Hereinafter, the term slide shall be used to indicate a support plate of standard size to which a biological sample, such as a cell or a biological tissue, is fixed using a prior art technique. It is clear that with appropriate changes to the dimensions, the present invention can be used to load any support for biological samples, in the form of plate or cassette (biocassette—histological cassette), and made of any material, such as glass, plastic, paraffin, etc. . . . .

Description of the Related Art

In the field of clinical diagnostics, there is the need to preserve biological samples taken from patients, such as histological and cytological samples.

The Guidelines (concerning Tracking, Collection, Transport, Preservation and Storage of cells and tissues for diagnostic investigations of ANATOMICAL PATHOLOGY) drawn up by the Ministry of Health and currently in force in Italy indicate that, due to the large number of samples and the many passages that can involve the material, from excision/collection until storage, also considering any subsequent uses (consulting, review, use in case studies for research purposes), it has become mandatory for the health authorities to guarantee tracking of the material, which must concern, analytically and peremptorily, all steps of the chain (sample collection room, operating rooms, transport and processing and storage path).

To this end, the slides are marked with a patient identification code, with the possibility of using sub-codes with letters and numbers, through which each sample can be traced back to the patient at all times. Said identification codes can also include, for example, data relating to the sample, information on the sample collection date and time, etc. . . . , they can be numerical or alphanumerical codes affixed manually, or printed, or affixed by means of labels, or by means of barcodes, QR codes, etc. . . . . Said identification codes are normally of the electronically readable type.

The step of storing slides provided with samples is a very delicate operation.

Currently, archives are composed of cabinets, inside which trays filled with slides are placed. These trays can be of linear type or of two-dimensional "matrix" type.

Currently, after being processed in the department, the slides are grouped together on a work surface. The slides are arranged manually on the work surface in increasing order according to patient code and also according to respective sub-codes. Subsequently they are housed inside various trays trying to respect the correct sequence of the codes. The trays are then placed inside the aforesaid cabinets.

As it is essential to be able to identify the slides inside the archives in which they are contained at all times, for example if it becomes necessary to conduct new operations on a specific sample of biological material previously stored, before placing the trays in the cabinets they must be classified in an orderly manner to create a unique correspondence between slide, its position in the tray and the position of the tray in the cabinet.

After all the slides have been loaded into the trays, these trays are inserted into scanner apparatus which read the identification codes of all the slides and record and memorize the position of each slide inside the tray.

The slides, already arranged inside the tray, are read by a reader simultaneously to the identification code of the tray, allowing the unequivocal association between slides and tray, to ensure a safe level of traceability.

The slides can be read dynamically, with a video camera that moves along at least a main axis of the tray, or statically by means of a fixed camera that acquires images of the whole area of the tray, without a reading sensor that moves along one or more axes and thus avoiding errors or faults caused by moving parts.

Using the image acquired, a software program:
 identifies the tray number marked by a 1D one-dimensional alphanumerical code, for example a barcode, or 2D two-dimensional image code, such as a QR code;
 identifies the exact position of each slide inside the tray.

At the end of each scanning process, all the data collected are stored in a database. A screen allows the position of the slides inside the tray to be viewed, highlighting in each box the identification code of the corresponding slide read.

The prior art technique described above has some limits and drawbacks and has a non-negligible error rate.

The main disadvantage relates to that fact that the filing step is carried out in two distinct steps, lengthening the process times: a first operation relates to the manual positioning of the slides in the compartments of the trays (which requires great care and precision due to the ratio of the dimensions between slides and trays) and a second operation which instead relates to the scanning/reading of the various identification codes.

An even bigger disadvantage is that the step of reading the identification codes after positioning the slides in the trays can be difficult (depending on whether or not they have been positioned correctly by the operator): when the slides are already arranged inside the tray they are difficult to identify, and in particular it is difficult to read their identification codes. The slides placed side by side in the compartments often overlap, concealing the identification codes and making it difficult for the video camera and/or scanner with pre-set position to read them.

In these cases, at times the operator must intervene manually, moving and handling the slides in order to facilitate reading of the codes with the risk of repositioning the slides incorrectly in the tray, in addition to increasing the process times.

The patent application MI2014A001417 discloses means for lifting the slides which, coacting with the bottom of the tray, temporarily lift each individual slide beyond a certain height, so that its identification code is visible to the video cameras without interference.

Although this solution solves the problem of clear reading of the identification codes, it does not overcome the problem of the two process steps (preliminary positioning in the tray and subsequent reading of the codes).

The document US 2014/362436 discloses a loading machine for slides provided with biological samples.

SUMMARY OF THE INVENTION

The invention intends to overcome these limits by defining a loading machine for slides provided with biological samples that allows correct and rapid reading of the identification codes of each slide and facilitates the tray loading operations, carrying out the step of reading the codes and the step of orderly positioning in the tray simultaneously.

It is therefore an object of the invention to produce a loading machine that is efficient, rapid, safe, of easy and immediate use for the operator.

These objects are achieved with a loading machine for slides, provided with biological samples and with an electronically readable identification code, inside a tray divided, by means of separation structures, into a plurality of compartments, each compartment being adapted to contain one of said slides in an orderly manner, where said loading machine is characterized in that it comprises:
  a supporting frame structure for resting on a work surface;
  linear feed means of said tray with respect to said frame structure;
  insertion means of said slides into said tray in an orderly and sequential manner;
  reading means of said identification code provided on each of said slides;
  a control unit,
where said insertion means of said slides into said tray comprise means adapted to temporarily retain each slide and to release it, in coordination with said reading means and linear feed means of said tray, into one of said compartments making use of gravity.

According to a first aspect of the invention, said insertion means comprise a substantially box-shaped body, comprising:
  a housing adapted to maintain said slide in a substantially vertical position;
  a reversibly movable index, adapted to retain each slide interfering temporarily with said housing and to release it subsequently.
  In particular, said housing comprises:
  an upper inlet and a lower outlet for each of said slides;
  a bottom wall and a front wall,
  where said bottom wall comprises a sloped portion so as to increase the section of said inlet to facilitate the insertion of said slides from above and so as to reduce the section of said outlet to precisely accompany the fall of said slides into said tray.

Advantageously, said front wall comprises a first window through which said reading means can detect the identification code of each slide.

According to a further aspect of the invention, said index can move horizontally between an operating position and an idle position in which it at least partially occupies said outlet of said housing.

Advantageously, said index comprises an actuator of solenoid or magnetic type.

In a preferred variant of the invention, said loading machine comprises a first and a second optical sensor positioned respectively above and below said index, where said first sensor detects the correct position of the slide in the housing, while said second sensor detects that the slide is no longer in the housing after falling into tray.

According to a possible variant of embodiment of the invention, said feed means of said tray comprise:
  a track;
  a slide comprising retaining means of said tray;
  a stepper motor adapted to move said slide in sequence on said track so that one of said compartments is positioned at the outlet of said housing.

Moreover, said reading means comprise a detector selected from a video camera, a scanner, one-dimensional or two-dimensional code readers with or without image acquisition, etc. . . . . .

Advantageously, said control unit is adapted to:
  receive a first signal from said first sensor of the presence of a slide in said housing;
  control said reading means of the identification code of the slide in the housing;
  control said actuator of said index so that it takes its correct operating position;
  receive a second signal from said second sensor of the absence of a slide in the housing thus indicating it has fallen;
  control said linear feed means of said tray.

The main advantage of the invention consists in speeding up the whole filing process, allowing continuous loading of the trays and simultaneous reading of the identification codes of the slides: in fact, it is possible to read the identification code of a slide during its insertion into the tray.

Said insertion means of said slides into said tray channel the slide toward the dedicated compartment of the tray and, making use of gravity, allow it to fall only after having read the code and/or acquired its image format. In fact, said insertion means also comprise means adapted to temporarily retain each slide and to release it only after its identification code has been read.

The position sensors provided on the insertion means verify the presence, or absence, of the slide in the housing so as to coordinate, with said control unit, all the components of the loading machine.

BRIEF DESCRIPTION OF THE DRAWINGS

The advantages of the invention will be more apparent below, from the description of a preferred embodiment provided by way of non-limiting example and with the aid of the figures, wherein:
FIGS. 5, 6 and 7 represent, respectively in a front plan view, in a top view and in a sectional view along a vertical plane, a part of the component of FIGS. 3 and 4;
FIG. 8 represents, in an axonometric view, the component of FIGS. 3 and 4 in three different operating steps according to the invention.

DESCRIPTION OF THE PREFERRED EMBODIMENTS

Figure 1:
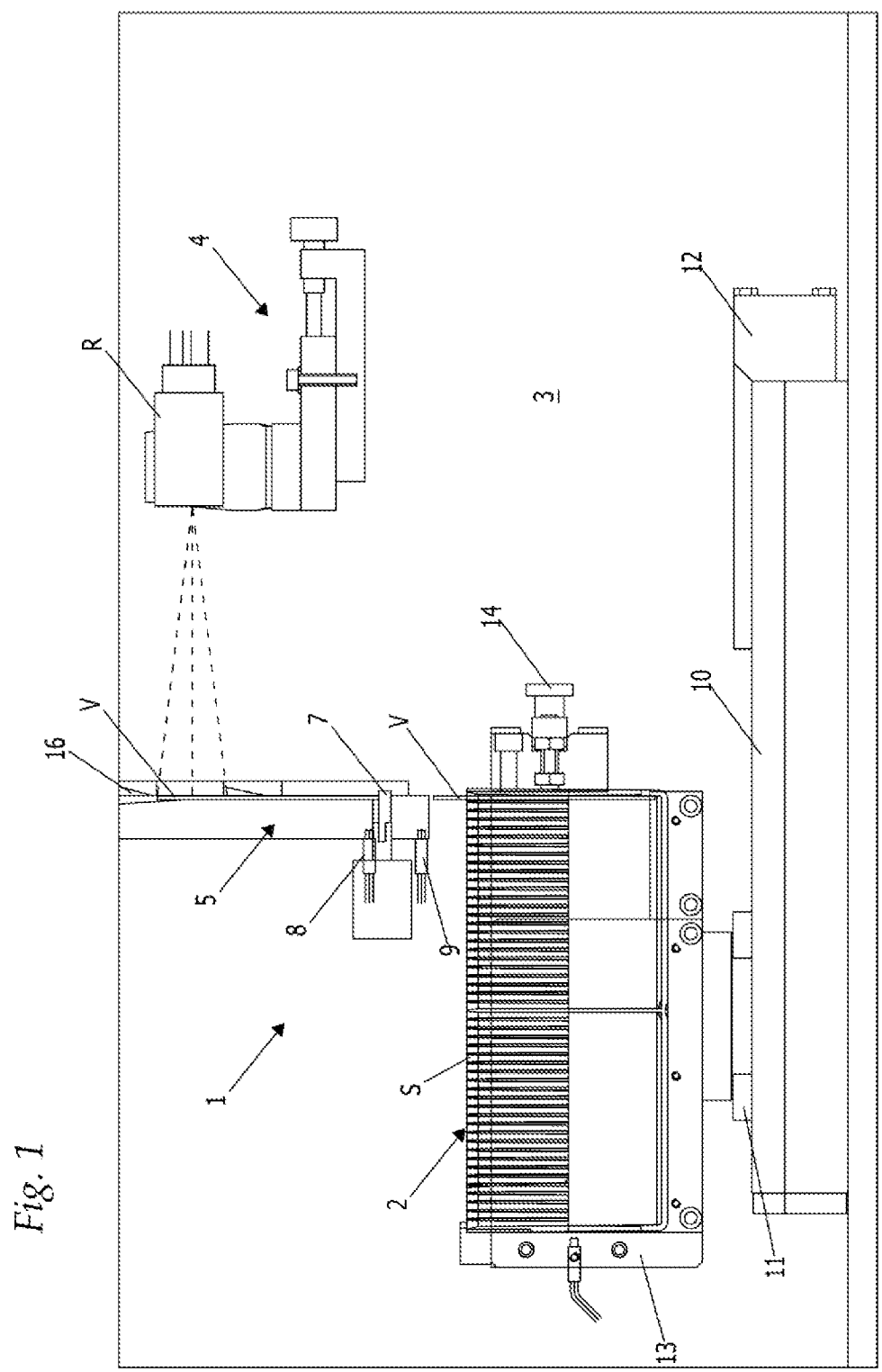
FIGS. 1 and 2 represent, in a schematic side plan view and in a front plan view, a loading machine for slides provided with biological samples according to the invention.
Figure 2:
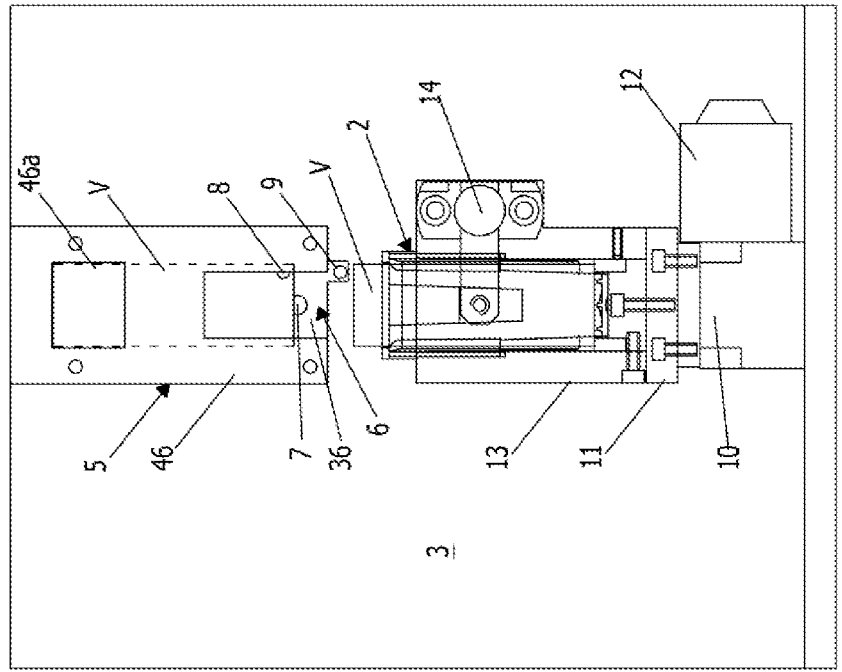

With reference to FIGS. 1 and 2, there is illustrated a loading machine 1 for slides V, provided with biological samples and with an electronically readable identification code C, inside a tray 2 of linear type divided, by means of separation structures of rib type, into a plurality of compartments S, each adapted to contain one of said slides V in an orderly manner.

Said loading machine 1 comprises:
a supporting frame structure 3 for resting on a work surface;
linear feed means 10, 11, 12 of said tray 2 with respect to said frame structure 3;
insertion means 5, 6, 7 of said slides V into said tray 2 in an orderly and sequential manner;
reading means 4 of said identification code C provided on each of said slides V;
a control unit (not illustrated), for example comprising a PLC or a PC.

Said insertion means of said slides V into said tray 2 comprise means adapted to temporarily retain each slide V and to release it, in coordination with said linear feed means of said tray 2, into one of said compartments S making use of gravity.

In order to avoid the risk of damage to the slide V during its fall into the tray 2, and to reduce irritating noise, the bottom of each tray 2 can be fitted with means adapted to soften the fall of the slide, for example consisting of a rubber mat.

Said feed means of said tray 2 comprise:
a track 10;
a slide 11 comprising retaining means of said tray;
a stepper motor 12 adapted to move said slide 11 linearly on said track 10 so that one of said compartments S is positioned to coincide with said insertion means.

Said retaining means comprise a cradle 13, adapted to surround said tray 2 at the rear and laterally, and a front pin 14 rotating through 90° and adapted to take a horizontal blocking position in which it interferes with said tray 2 and a vertical release position.

Said reading means 4 comprise a detector R selected from a video camera, a scanner or other 1D/2D code readers with CMOS sensor, where 1D readers read barcodes, while 2D readers read QR codes with image acquisition.

With particular reference to FIGS. 3-8, said insertion means of said slides V in said tray 2 are illustrated.

Said insertion means comprise a substantially box-shaped body 5, comprising a housing 6 adapted to temporarily maintain said slide V in a substantially vertical position.

Said housing 6 comprises:
an inlet 16 and an outlet 26 for each of said slides V;
a bottom wall 36 and a front wall 46.

Said bottom wall 36 comprises a sloping portion 36' (appreciable from the section of FIG. 7) so as to provide the housing 6 with an inlet 16 with an increased section to facilitate insertion of said slides V and an outlet 26 with a reduced section, substantially the same as the section of the slide V, to accompany and direct its fall into the respective compartment S of the tray 2 below more precisely. More in general, all four walls of said housing 6, at said inlet 16, can slope slightly, in order to create a flaring to facilitate insertion of the slide V into the housing.

Said insertion means further comprise a reversibly movable index 7, in the form of a piston, adapted to interfere temporarily with said housing 6.

Said index 7 protrudes reversibly from said bottom wall 36, orthogonally thereto.

In particular, with reference to the three operating steps illustrated in FIG. 8, said index 7 can move horizontally between an idle position, in which it at least partially occupies said outlet 26 of said housing 6 preventing the passage of said slide V, retaining it in vertical suspended position, and an operating position, in which it is totally concealed inside said box-shaped body 5.

Said index 7 comprises an actuator of solenoid or magnetic type; alternatively, it could comprise a spring system that is capable of ensuring an alternating withdrawal and release movement.

Figure 3:
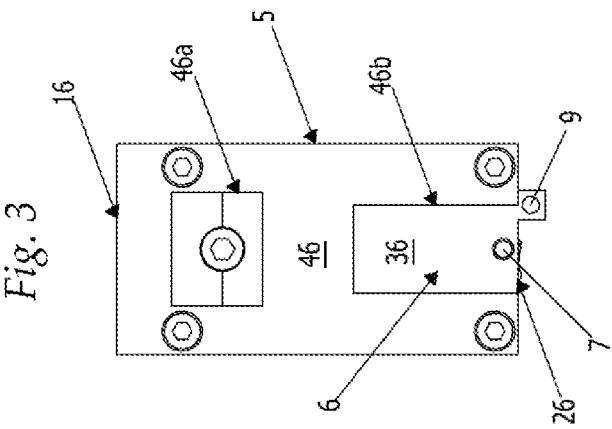
FIGS. 3 and 4 represent, respectively in a front plan view and in a top view, a component of the machine of FIGS. 1 and 2.
Figure 4:
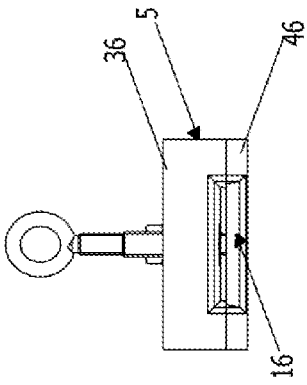

With reference to FIG. 3, the front wall 46 of said housing 6 comprises a first window 46a through which said reading means 4 can detect the identification code C of each slide V, when the latter is supported by said index 7 in idle position.

Said front wall 46 further comprises a second window 46b provided in proximity of said outlet 26 adapted to facilitate manual removal by the operator of any blocked or incorrectly positioned slides V.

With reference to the figures, said loading machine 1 comprises a first 8 and a second 9 position sensor, positioned respectively above and below said index 7.

Said sensors 8, 9 are of optical type; in particular, they are fibre optic sensors.

Said first sensor 8 verifies the presence of the slide V in the housing 6 of the box-shaped body 5 and detects its correct position and centring, important to ensure correct reading of the identification code C of the slide V through said first window 46a by the reading means 4.

Said second sensor 9 instead detects the absence of the slide V in the housing 6 to ensure it has fallen into the tray 2.

Operation of the invention, coordinated by said control unit, is simple and described below.

The operator inserts a slide V into the inlet 16 of the housing 6 of said insertion means.

The movable index 7 is in idle position, i.e., occupies the outlet 26 of the housing 6 supporting the slide V in vertical position.

The identification code C of said slide V is visible through said first window 46a.

Said control unit governs the following operations:
receiving a first signal from said first sensor 8 of the presence of the slide V in said housing 6;
controlling said reading means 4 of the identification code C of the slide V in the housing 6;
controlling said actuator of said index 7 so that it takes its operating position and withdraws allowing the slide V to fall into the tray 2 below;
receiving a second signal from said second sensor 9 of the absence of slides V in the housing 6, confirming that the slide V that has just been read has fallen;
controlling said linear feed means 10, 11, 12 of said tray 2 so that an empty compartment S of the tray 2 is positioned under said outlet 26.

The operator inserts a new slide V into the inlet 16 of the housing 6 and the procedure is repeated until the tray 2 is full and/or until there are no more slides V to be filed.

The invention claimed is:
1. A loading machine for slides, the slides provided with biological samples and with electronically readable identification codes, the slides located inside a tray divided by separation structures into a plurality of compartments, each compartment being adapted to contain one of said slides in an orderly manner,
said loading machine comprising:
a supporting frame structure for resting on a work surface;
linear feed means for feeding said tray with respect to said frame structure;

insertion means for insertion of said slides into said tray in an orderly and sequential manner;
reading means for reading an identification code provided on each of said slides; and
a control unit,
wherein said insertion means comprise means adapted to temporarily retain each slide and to release said slide, in coordination with said reading means and said linear feed means into one of said compartments making use of gravity,
wherein said insertion means further comprise a substantially box-shaped body, comprising:
a housing adapted to maintain said slide in a substantially vertical position;
a reversibly movable index, adapted to retain a slide interfering temporarily with said housing and to subsequently release said slide, and
wherein said housing comprises:
an upper inlet and a lower outlet;
a bottom wall and a front wall,
wherein said bottom wall comprises a sloped portion so as to provide a section of said upper inlet with a dimension greater than a corresponding dimension of a section of said lower outlet to facilitate insertion of said slides from above and so to precisely accompany the fall of said slides into said tray.

2. The loading machine according to claim 1, wherein said front wall comprises a first window through which said reading means can detect the identification code of each slide.

3. The loading machine according to claim 1, wherein said index can move horizontally between an operating position and an idle position in which the index at least partially occupies said lower outlet of said housing.

4. The loading machine according to claim 3, wherein said index comprises a solenoid actuator or a magnetic actuator.

5. The loading machine according to claim 1, wherein said feed means for feeding said tray comprise:
a track;
a slide comprising retaining means for retaining said tray;
a stepper motor adapted to move said slide in sequence on said track so that one of said compartments is positioned at the lower outlet of said housing.

6. The loading machine according to claim 1, wherein said reading means comprise a detector selected from a group consisting of a video camera, a scanner, and one-dimensional or two-dimensional code readers.

7. A loading machine for slides, the slides provided with biological samples and with electronically readable identification codes, the slides located inside a tray divided by separation structures into a plurality of compartments, each compartment being adapted to contain one of said slides in an orderly manner,
said loading machine comprising:
a supporting frame structure for resting on a work surface;
linear feed means for feeding said tray with respect to said frame structure;
insertion means for insertion of said slides into said tray in an orderly and sequential manner;
reading means for reading an identification code provided on each of said slides;
a control unit,
wherein said insertion means comprise means adapted to temporarily retain each slide and to release said slide, in coordination with said reading means and said linear feed means into one of said compartments making use of gravity;
a housing adapted to maintain said slide in a substantially vertical position;
a reversibly movable index, adapted to retain a slide interfering temporarily with said housing and to subsequently release said slide; and
a first and a second optical sensor positioned respectively above and below said index, where said first optical sensor detects a correct position of the slide in the housing, while said second optical sensor detects that the slide is no longer in the housing after falling into the tray.

8. The loading machine according to claim 7, wherein said control unit is adapted to:
receive a first signal from said first optical sensor of the presence of a slide in said housing;
control said reading means for reading the identification code of the slide in the housing;
control an actuator of said index so that the index takes a correct operating position;
receive a second signal from said second optical sensor of the absence of a slide in the housing thus confirming that the slide has fallen; and
control said linear feed means for feeding said tray.

* * * * *